US006415255B1

(12) United States Patent
Cohen et al.

(10) Patent No.: US 6,415,255 B1
(45) Date of Patent: Jul. 2, 2002

(54) APPARATUS AND METHOD FOR AN ARRAY PROCESSING ACCELERATOR FOR A DIGITAL SIGNAL PROCESSOR

(75) Inventors: Paul E. Cohen, San Jose; Ioannis S. Dedes, Mountain View, both of CA (US)

(73) Assignee: NEC Electronics, Inc., Santa Clara, CA (US)

( * ) Notice: Subject to any disclaimer, the term of this patent is extended or adjusted under 35 U.S.C. 154(b) by 0 days.

(21) Appl. No.: 09/329,499

(22) Filed: Jun. 10, 1999

(51) Int. Cl.[7] ......................... G10L 19/12; G10L 19/04; G09G 5/02; G06K 9/62

(52) U.S. Cl. ....................... 704/223; 704/230; 704/221; 345/827; 345/810

(58) Field of Search ................................ 704/500, 201, 704/501, 504, 221, 223, 230; 345/827, 810

(56) References Cited

U.S. PATENT DOCUMENTS

| | | | | |
|---|---|---|---|---|
| 3,794,984 A | * 2/1974 | Deerfield et al. | ............. | 712/11 |
| 5,025,407 A | * 6/1991 | Gulley et al. | ............... | 708/514 |
| 5,195,137 A | * 3/1993 | Swaminathan | .............. | 704/222 |
| 5,526,407 A | * 6/1996 | Russell et al. | .............. | 704/251 |
| 5,719,993 A | * 2/1998 | Kleijn | ........................ | 704/220 |
| 5,924,062 A | * 7/1999 | Maung | ....................... | 704/219 |
| 5,987,556 A | * 11/1999 | Nakagawa et al. | ........... | 712/35 |

OTHER PUBLICATIONS

Boncz et al ("Binary Association Tables," The Monet database kernal as published at http://medusa.cw.nl.8080/~Monet/ . . . Sep. 1997).*

* cited by examiner

*Primary Examiner*—Richemond Dorvil
*Assistant Examiner*—Daniel A Nolan
(74) *Attorney, Agent, or Firm*—Skjerven Morrill LLP

(57) ABSTRACT

A data processing system for use in arrays includes a digital signal processor, a search accelerator unit and memory unit, the memory unit having a group storage locations that store the data entries of the matrix. The locations in the matrix are identified by the indices of the location. The access of the matrix by the digital processing unit typically includes an access to a series of locations at periodic intervals along a row or diagonal of the matrix. The series of data entries can include a sequence of non-neighboring matrix data entries. The search accelerator unit includes at least one pointer unit. The pointer unit in the search accelerator unit receives beginning array indices identifying the array entry. The pointer unit increments the array indices to provide the sequence of data entry indices for the matrix. The data entry array indices are converted to a series of memory location addresses. By using the search accelerator unit to provide the resulting series of memory location addresses, the digital signal processor is relieved of developing a series of non-regular addresses for memory locations. The search accelerator unit can include a size register that determines the size of the matrix to be searched and determines the increment used in searching the matrix. The invention is applied to the processing of speech signals using codebook matrices.

41 Claims, 5 Drawing Sheets

| | | | | | | | | |
|---|---|---|---|---|---|---|---|---|
| 0 | 1 | 3 | 6 | 10 | 15 | 21 | 28 | . . . |
| | 2 | 4 | 7 | 11 | 16 | 22 | 29 | . . . |
| | | 5 | 8 | 12 | 17 | 23 | 30 | . . . |
| | | | 9 | 13 | 18 | 24 | 31 | . . . |
| | | | | 14 | 19 | 25 | 32 | . . . |
| | | | | | 20 | 26 | 33 | . . . |
| | | | | | | 27 | 34 | . . . |
| | | | | | | | 35 | . . |

APPARATUS AND METHOD FOR AN ARRAY PROCESSING ACCELERATOR FOR A DIGITAL SIGNAL PROCESSOR

BACKGROUND OF THE INVENTION

1. Field of the Invention

This invention relates generally to the processing of arrays of information, and more particularly, to systematic searches involving selected locations in arrays of information. The invention is particularly relevant to Algebraic Code Excited Linear Prediction (ACELP) speech encoding techniques.

2. Description of the Related Art

In certain applications, arrays of information are searched in a systematic manner. While the search may be systematic, the search can involve skipping one or a plurality of array locations. Furthermore, the search, when conducted for a multi-dimensional array, can involve locations on selected rows, columns, and/or diagonals of the array.

An important application of a systematic array search involves signal encoding. According to one technique for the signal encoding, the signal is sampled in the time domain. The samples are grouped and processed as vectors. These vectors are compared with a preselected collection of vectors referred to as a codebook. When a codebook vector is found that corresponds in a predetermined manner to the input vector, the vector is stored at the array a location index (i.e. address) provides a representation of the corresponding vector sample. In order to reconstruct the original signal, the array index is used to access the location in an array, the accessed array being similar to the original signal. The vector parameter is retrieved from the accessed location in the array and used to represent the sample vector for that particular portion of the original signal from which the vector sample was derived. In this manner, the original signal can be reconstructed with a deviation from the original signal determined by the granularity of the vector values in the array and on the frequency of the sampling process.

Referring to FIG. 1, a block diagram of a processing system for encoding and reconstructing a signal is shown. The original signal is sampled and the resulting sample vectors are applied to processing unit 5. Processing unit 5 searches array 6 and determines which array location stores a vector value that most closely approximates the sample vector. (As will be clear to those skilled in the art of speech processing, array 6 and array 8 exist as concepts for purposes of description and have no physical counterpart.) The index (address) of the array location is then stored if storage of the original signal is desired, or is transmitted to a receiver unit if transmission of the original signal is desired. The processing unit 7 (which may be the same as processing unit 5 for signal storage and retrieval) has the array indices applied thereto. Processing unit 7 retrieves the vector parameter from array 8, array 8 being identical to array 6. The series of vector parameters is applied to the output terminal of processing unit 7, the series of vector parameters reconstructing the series of vector samples applied to the input terminals of processing unit 5. It will be clear that if the original is an analog signal, then the vector samples are digitized prior to application to processing unit 5. Similarly, the series of output vector parameters must be processed to provide an analog reconstruction of the original signal.

As indicated above, the ability of the processing system to reconstruct accurately the original signal generally relates to the granularity of the array, i.e., the size of the array. The larger the number of vector parameters in the array or codebook, the closer the vector parameters can approximate the vector sample. In addition, the original signal can be as rapidly varying and non-periodic as a function of time. These characteristics require a frequent sampling rate for accurate reproduction of the original signal. These two requirements can place enormous computing requirements on the processing units, especially on the processing unit required to perform the encoding process.

Several speech coding standards, such as G.729 and G.723.1, approved by the International Telecommunications Union (ITU), employ a codebook with an algebraic structure. When such a codebook with an algebraic structure is used, the search procedure employs a rectangular matrix to which accesses along diagonals are made. The size of the matrix and the nature of the accesses depend on other system parameters, such as the bit rate of the operation of the encoder and the size of the input vector. The procedure employed by the Enhanced Full Rate Codec (EFRC), presented in the EIA/TIA Interim Standard 641, Revision A, is selected hereinafter to illustrate features of the present invention. The procedure employed by the EFRC provides for accessing the matrix along either diagonal paths or along row paths. In either type of access, a plurality of sequential accesses is made, each access having a starting index (matrix address) and subsequently skipping 5 locations before accessing the next array location in the index.

Digital signal processors are a specialized group of data processing units that provide high computation rates, the high computation rates being at least partially the result of a limited instruction set. The digital signal processor, because of its high computational capabilities, has been applied to the problems of using the ACELP codebook to encode speech signals. Referring to FIG. 2, the use of a digital signal processor 21 for the processing of speech signals is shown. The digital signal processor has coupled thereto an X memory system 23 and a Y memory system 22 for storing signal parameters. One of the memory systems, the X memory system 23, can include a conventional memory unit 231. A portion of the memory locations 2311 in the conventional memory unit 231 store the signal groups representing the array vector parameters. The digital signal processor 21 has applied thereto input vector samples (i.e., representing sampled original speech signal). The input vector samples are then processed and relevant correlation values are computed and stored in the array portion 2311 of the conventional memory 231 according to the procedures of the search technique (i.e., EFRC) used in the current application. The X-memory system portion 2311 is a conventional memory representation of the matrix required to evaluate codebook vectors for an ACELP search. When the closest match between the input vector and a codebook vector is found, the index of that codebook vector is stored. In this manner, a series of memory location addresses are generated that can be used in the reconstruction of the original speech signal.

The processing technique, described above, has several problems in the physical implementation. For example, the correlation values that are used for evaluating codebook vectors are organized as a two-dimensional matrix. When evaluating codebook vectors, it is necessary to access the matrix of correlation values both along diagonals and along rows. Along either the diagonals or along the rows, the accesses, though regularly spaced, are not to neighboring locations. By way of specific example, the EFRC procedure that is being used as example, can skip five positions between sequential accesses. In addition, the matrix used in the ACELP search procedure includes redundant information, i.e., the array has mirror symmetry with respect to the main diagonal of the array. Typically, the redundant groups (i.e., correlation values) are retained to simplify the addressing requirements of the encoding search algorithms.

More precisely, the EFRC speech encoder algorithm fills in the matrix by storing data signal groups (i.e., the vector parameters) along the main diagonal 9 (see Appendix 1) and along each of the sub-diagonals of the matrix (see Appendix 2). Once the matrix has the vector parameters stored therein, the matrix is not modified further until the next frame of speech data. The matrix has several parameters that define the relationship of the EFRC encoding procedure to other procedures. The parameter L is the width and length of the matrix. As indicated above, the ACELP matrix involved in the search procedure has the parameters L=40 providing for 40×40 matrix or 1600 parameters, each parameter represented by a 16-bit word. Another parameter of the ACELP search procedure is the STEP or the increment used in the particular implementation. In the encoding process, a nest of loops is used to access the matrix array. (The software algorithm for referencing the matrix is included as Appendix 3.) The matrix is referenced along the main diagonal, each reference skipping 5 positions from the previous reference. The remaining referencing is along the rows of the matrix, the referencing again skipping five positions from the previous referencing.

As indicated above, the digital signal processor, because of the computation power, is used to implement the speech encoding procedure. References along a row of an array, even skipping five positions at a time, can be performed efficiently by a digital signal processor even with the reduced instruction set. Difficulty arises because the codebook matrix must be in either a conventional X-memory system or in a conventional Y-memory system. The digital signal processor typically has an insufficient number of pointers assigned to each memory system for providing convenient addressing as required by the search algorithm. The computation would be easily performed if the memory unit, in which the codebook has been stored, has at least seven pointers (i.e., one for each access along a row) assigned thereto in the digital signal processor. When the referencing along a diagonal is included, ten pointers would be required for convenient referencing by the digital signal processor using the EFRC search algorithm. The difficulty can be understood as follows. For the digital signal processor to make search references along a diagonal of the codebook array, the processor must compute the address in a general register and then store the computed address into a data pointer (after having saved the previous value). The required number of pointers are not available in the typical digital signal processor.

The symmetry of the matrix can be used to provide a triangular sub-matrix (of 820 words in the case of EFRC procedures). Consequently, the use of the sub-matrix can be used advantageously to conserve memory space. However, the triangular sub-matrix, because of the new geometry, provides even greater addressing signal difficulties for the digital signal processor because the rows are no longer continuous across the array.

A need has been felt for apparatus and an associated technique for efficient accessing of an array occupying a reduced memory space. A need has further been felt for apparatus and an associated technique that would have the feature of providing an efficient addressing of the array occupying a reduced memory space. A need has still further been felt for apparatus and an associated technique having the feature that a digital signal processor can be used to implement regular but non-neighboring accessing of locations along diagonals or rows during the accessing of an array.

SUMMARY OF THE INVENTION

The aforementioned and other features are accomplished, according to the present invention, by providing apparatus, hereinafter referred to as a search accelerator unit (SAU), to assist a digital signal processor in the accessing a sequence of regularly (incrementally) spaced non-neighboring locations of an array. The SAU of the present invention, the SAU being external to the digital signal processor, supplements the addressing capability of a digital signal processor so that references to a sequence of entries in the array can be performed more efficiently. In addition, when the (two-dimensional) array is symmetrical, the redundant entries can be eliminated by forming a triangular sub-array. The sub-array achieves a significant reduction in memory required to store the data signal groups. The apparatus and technique of the present invention is described with reference to the ACELP search procedure employed in the EFRC search encoder. Apparatus is disclosed for the SAU that permits the search of a sub-array wherein both the size of the matrix and the incremental step can be programmed.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
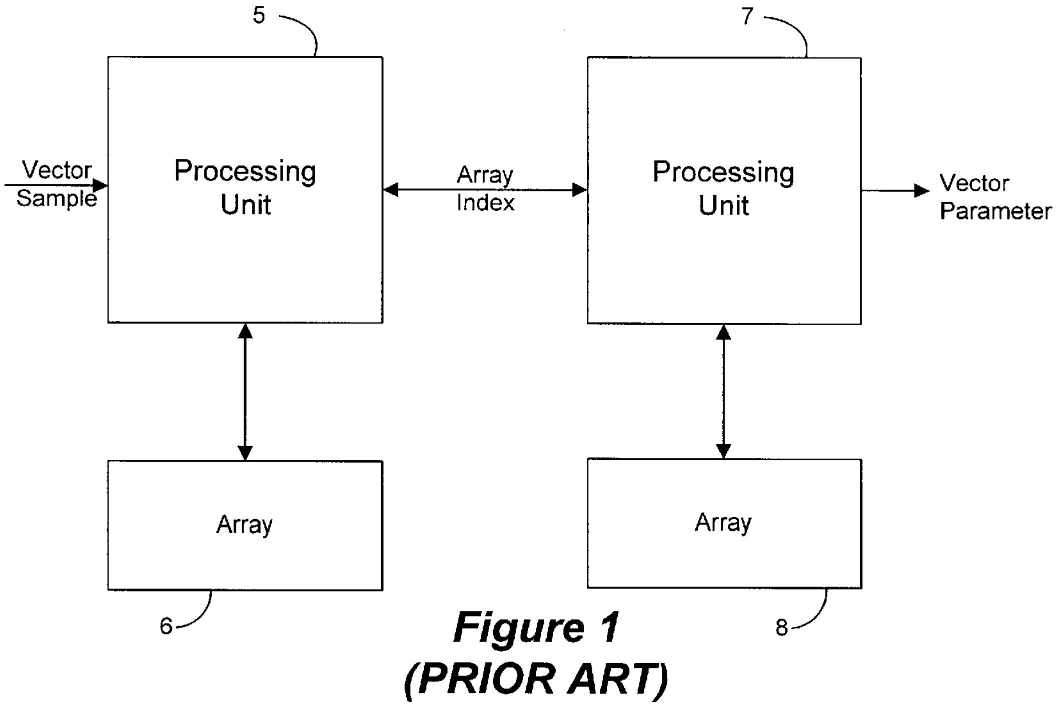
Figure 1 (PRIOR ART)
FIG. 1 is a block diagram showing a processing of an array applied to signal encoding and reconstruction techniques according to the prior art.
Figure 2:
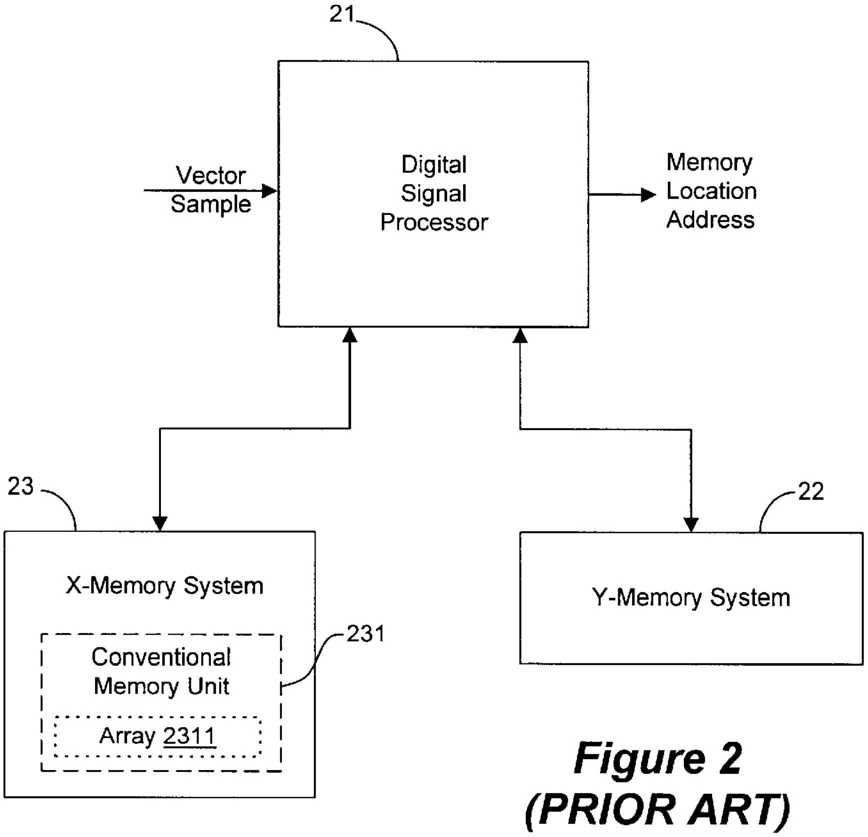
Figure 2 (PRIOR ART)
FIG. 2 is a block diagram showing the use of a digital signal processor to process an array applied to signal encoding a reconstruction according to the prior art.

FIG. 1 and FIG. 2 have been discussed with respect to the prior art.

Figures 3, 4:
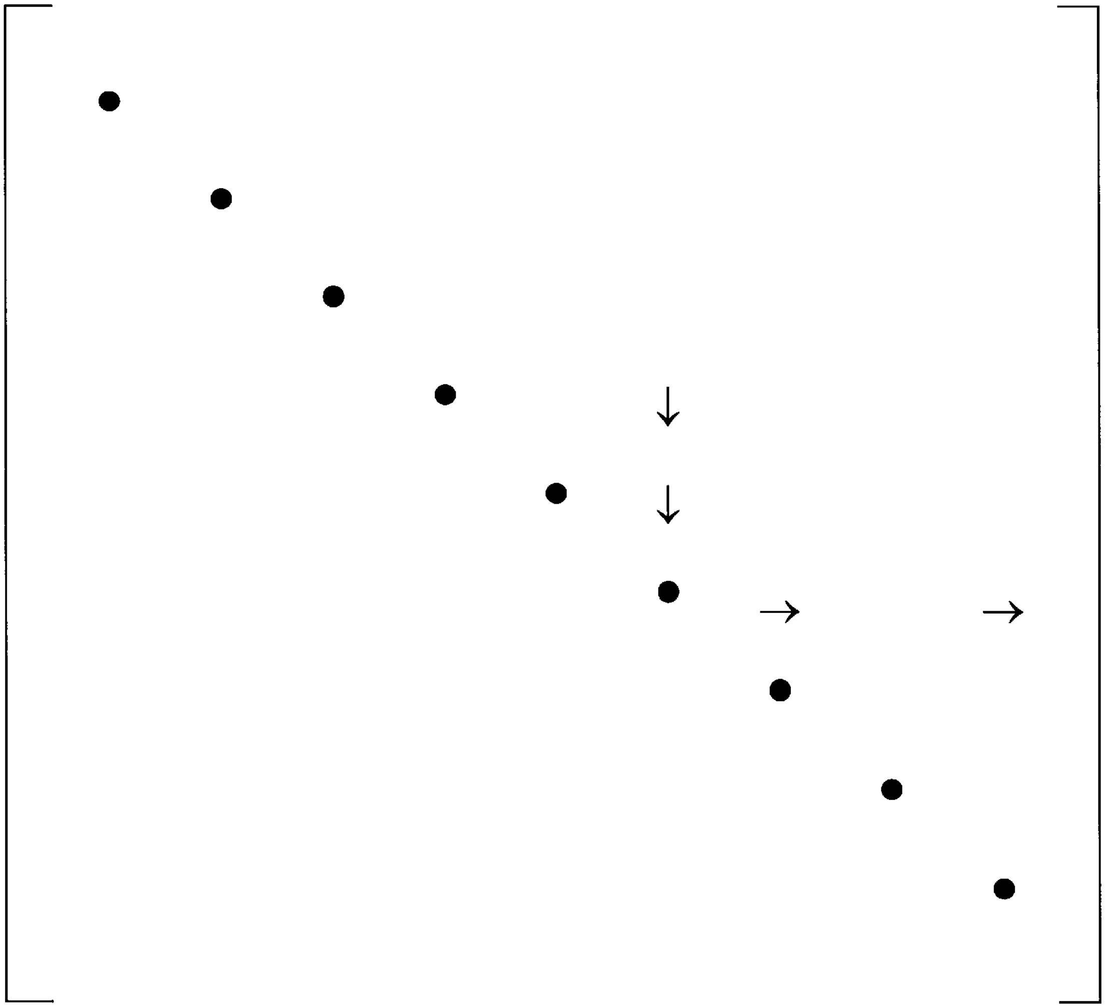
FIG. 3 illustrates the relationship between the entries of the sub-matrix and the memory unit entries for the ACELP matrix according to the present invention.
FIG. 4 illustrates a search path in the ACELP matrix in the sub-array for an EFRC search according to the present invention.

As indicated above, one of the aspects of the present invention is to reduce the required number of memory locations required to store the ACELP matrix. The technique for reducing the number of storage locations recognizes that the matrix is symmetric with respect to the main diagonal of the array. Referring next to FIG. 3, the mapping of the entries in the matrix to the actual location address of a conventional memory unit is shown. Because the array elements are typically identified by an index including the row and column number, then, in order to reference a particular location in the triangular array as shown in FIG. 3, the conversion from an array location to a linear address must be known. The array location <row, col> is converted to the linear address addr, when col≧row and the row and column numbering begin with 0, by the equation $$addr=row+\{col\times(col+1)\}/2 \qquad 1.)$$

Because the full rectangular matrix is not represented in memory, a memory reference to a location <m, n> in the rectangular matrix must sometimes be made to address <n, m> in the triangular sub-matrix that is actually represented in memory. This alternative means that for a sequential reference along a row of the full array must be made to a column of the reduced matrix until the diagonal is reached, and then the referencing must be made along the row where the reflection at the diagonal occurs. As an example, when references across row 17 of the full matrix is required starting, for example, at column 4, (with an increment of 5), the matrix references (using the notation of the pseudocode programs in the Appendices) are:

rr[17, 4], rr[17, 9], rr[17, 14], rr[17, 19], rr[17, 24], rr[17, 29], rr[17, 34], rr[17, 39].

However, if T is the reduced matrix array, then the memory references are:

T[4, 17], T[9, 17], T[14, 17], T[17, 19], T[17, 24], T[17, 29], T[17, 34], T[17, 35].

This path is illustrated in FIG. 4. Next mapping the <row, col> addresses to the linear address addr as indicated in Equation 1, the linear address sequence becomes:

157, 162, 167, 207, 317, 452, 612, 797

An address sequence such as this would be difficult for a digital signal processor to generate efficiently.

Figure 5:
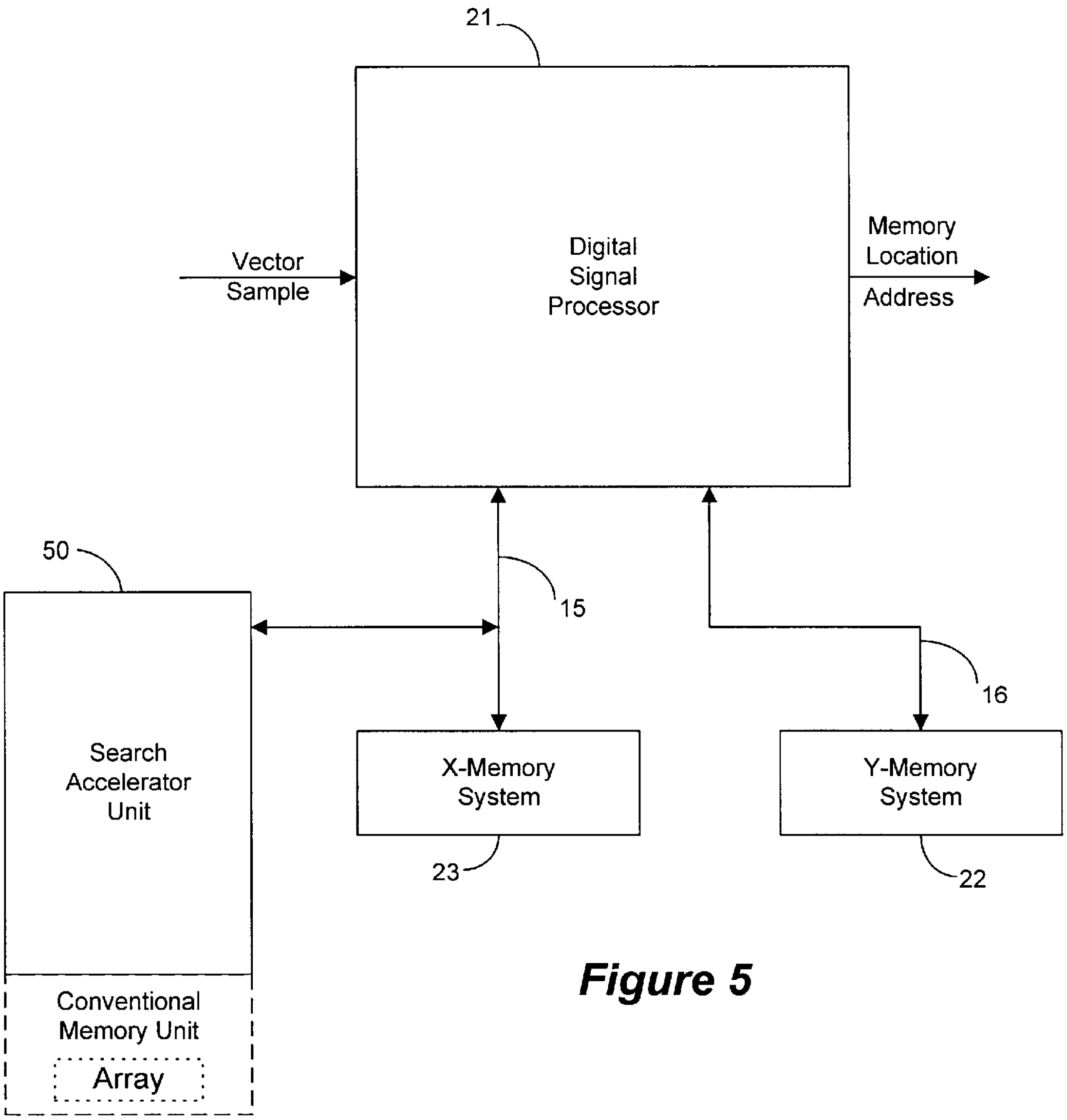
FIG. 5 is a block diagram of the array processing system according to the present invention.

In order to provide an improved mechanism for accessing the locations of a memory array, a search accelerator unit (SAU), that can be used inter alia to implement a EFRC access procedure, is added to the processing system as shown in FIG. 5. The digital signal processor 21 receives input vector samples and, based on the comparison of the contents of the accessed codebook locations, generates addresses of memory location, i.e., of the selected codebook data entry. The X-memory system 23 and the Y-memory system 22 are coupled to the digital signal processor 21 by address/data buses 15 and 16 respectively. The search accelerator unit 50 can be coupled to one (or both) of the address/data buses 15, 16, the address/data bus 15 associated with the X-memory system 23 is shown as an example in FIG. 5. The memory addresses determined by the algorithm being executed by digital signal processor 21 are applied to output terminals. However, it will be clear that these memory location addresses can be stored in one of the memory systems 22, 23 coupled to the digital signal processor unit 21.

Figure 6:
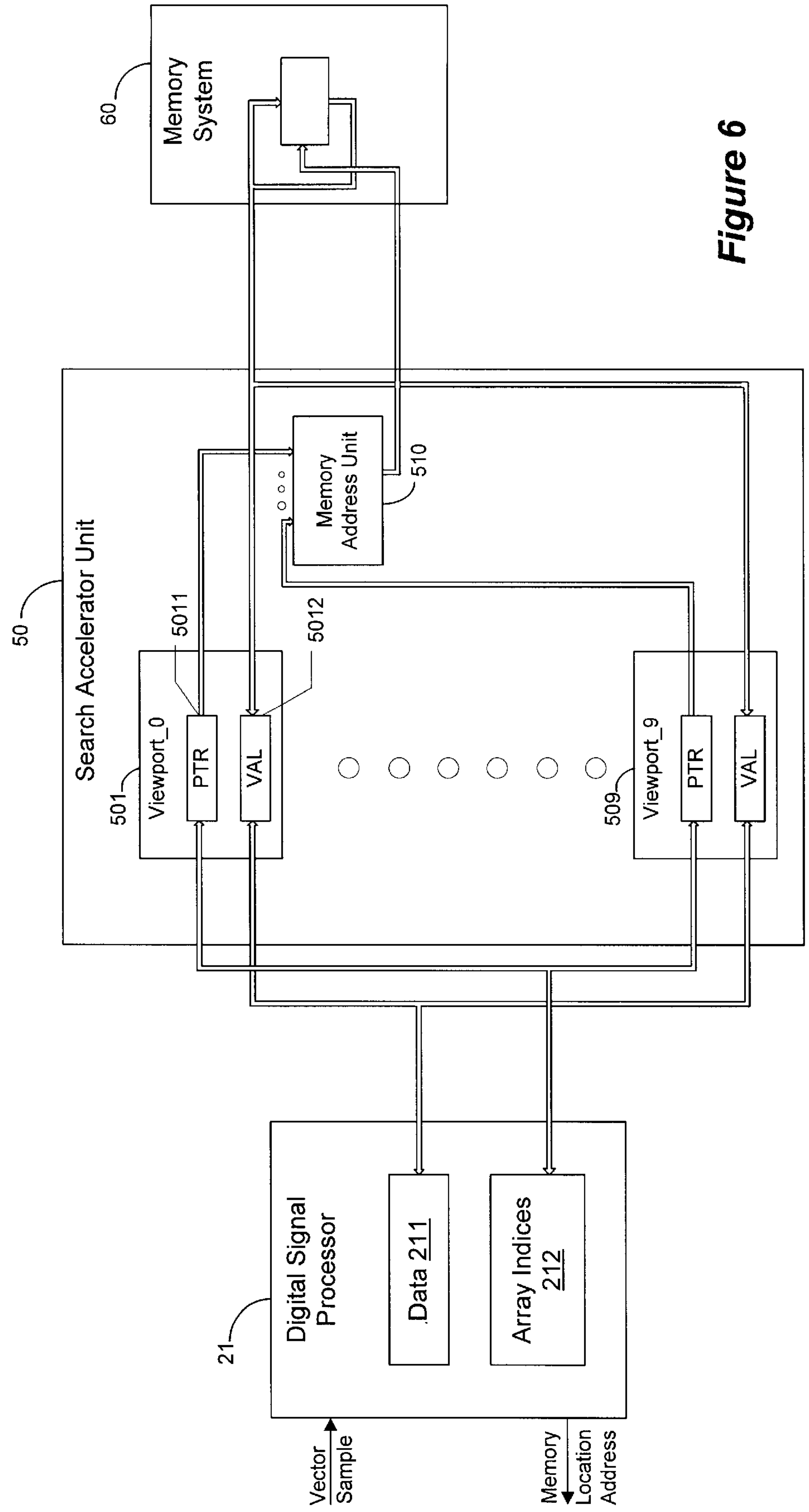
FIG. 6 is an expanded block diagram of the array processing system illustrating the configuration of the search accelerator unit according to the present invention.

Referring next to FIG. 6, a more detailed block diagram of the speech encoding system of the present invention is shown. The digital signal processor 21 is shown as including a data register 211 and an array indices register 212. The data register 211 receives data signal groups from the search accelerator unit 50 and transmits data signal groups to the search accelerator 50. The array indices register 212 applies array indices to the search accelerator unit 50. The search accelerator unit 50 includes a plurality of viewports, viewport_0 through viewport_9, (the number of viewports will be a function of the particular application). Each viewport includes a pointer unit and a data register, i.e., viewport_0 includes pointer unit 5011 and data register VAL 5012, etc. The pointer register 5011 receives array indices from the digital signal processor 21. The pointer register applies these array indices to the memory address unit 510. The memory address unit 510 converts the array indices to a memory system location address. The application of signals from the memory address unit 510 to memory system 60 results in an access to the memory location as identified by the array indices. As will be described in more detail below, the array indices in the pointer unit are incremented in a predetermined manner. The incremented array indices are then applied to the memory unit 60 to access the next memory location identified by the (incremented) array indices in the pointer unit. The data register VAL 5012 exchanges data signal groups with the digital signal processor and the addressed memory system location, the direction of the exchange being determined by whether the storage (write) operation or a retrieval (read) operation is being executed.

TABLE 1

| Parameter | Meaning | Value for EFRC SAU |
|---|---|---|
| L | Width and Height | 40 |
| B | RAM Block Size | 820 = L(L + 1)/2 |
| STEP | Increment | 5 |
| VP | Number of Viewports | 10 |

The search accelerator unit will be described using parameters that typically describe a matrix. These parameters are described in Table 1. Moreover, the specific examples relate to the EFRC-directed interaction with the matrix. It will be clear that this discussion is to illustrate the invention and that the search accelerator unit has wider applicability than to the processing of speech signals.

The search accelerator unit is coupled to a block of B memory locations, each location capable of storing a word of 16 bits in RAM memory. This group of memory locations is not directly accessible through either the X-memory address/data bus 15 or the Y-memory address/data bus 16. Instead the digital signal processing unit accesses these memory locations through a viewport determined by an address signal group. A search accelerator unit 50 appears to the digital signal processor as a pair of non-consecutive memory addresses, either in the X-memory system 23 or the Y-memory system 22. More precisely, these viewport address pairs appear in the digital signal processor memory space as a pair of arrays PTR[ ] and VAL[ ], each with viewport elements. Intuitively, if 0≦k<VP, then PTR[k] is a pointer into the triangular array and VAL[k] is the value of the data at that location. The word "pointer" here does not have the common meaning of the word. The PTR[k] consists of two six-bit fields, Row and Col and one four-bit field, OP, as illustrated below.

PTR[k]: ←OP(4)→←Row(6)→←Col(6)→

The Row field can also be accessed separately at an address_ROW[k] in the memory mapped footprint of the search unit accelerator 50. The ROW[k] has a six-bit field and a ten-bit empty field associated therewith as illustrated below.

ROW[k]: ←0(10)→←Row(6)→

Reading ROW[k] yields the same result as reading PTR[k], shifting the PTR[K] six bits to the right and masking out the OP field. Similarly, writing the ROW[k] can be accomplished by reading the PTR[k] field, changing the Row field and writing it back in the ROW[k] register. The ROW[k] registers are included because the read and write operations to determine or to set the Row field of the PTR[K] occur often enough to warrant supporting them with hardware. Whenever Row is known at the time OP and Col are initialized, all three values should be written to the search accelerator unit 50 since each write operation, either to ROW[k] or to VAL[k] results in activity in the search accelerator unit 50 that will cause delays and increase power.

The Row and Col signal groups are unsigned integer values that designate the row and column indices of the (full) symmetric array or matrix. A read or write operation to VAL[k] will provide a read or a write to the corresponding location in the search accelerator unit memory system 60.

Figure 7:
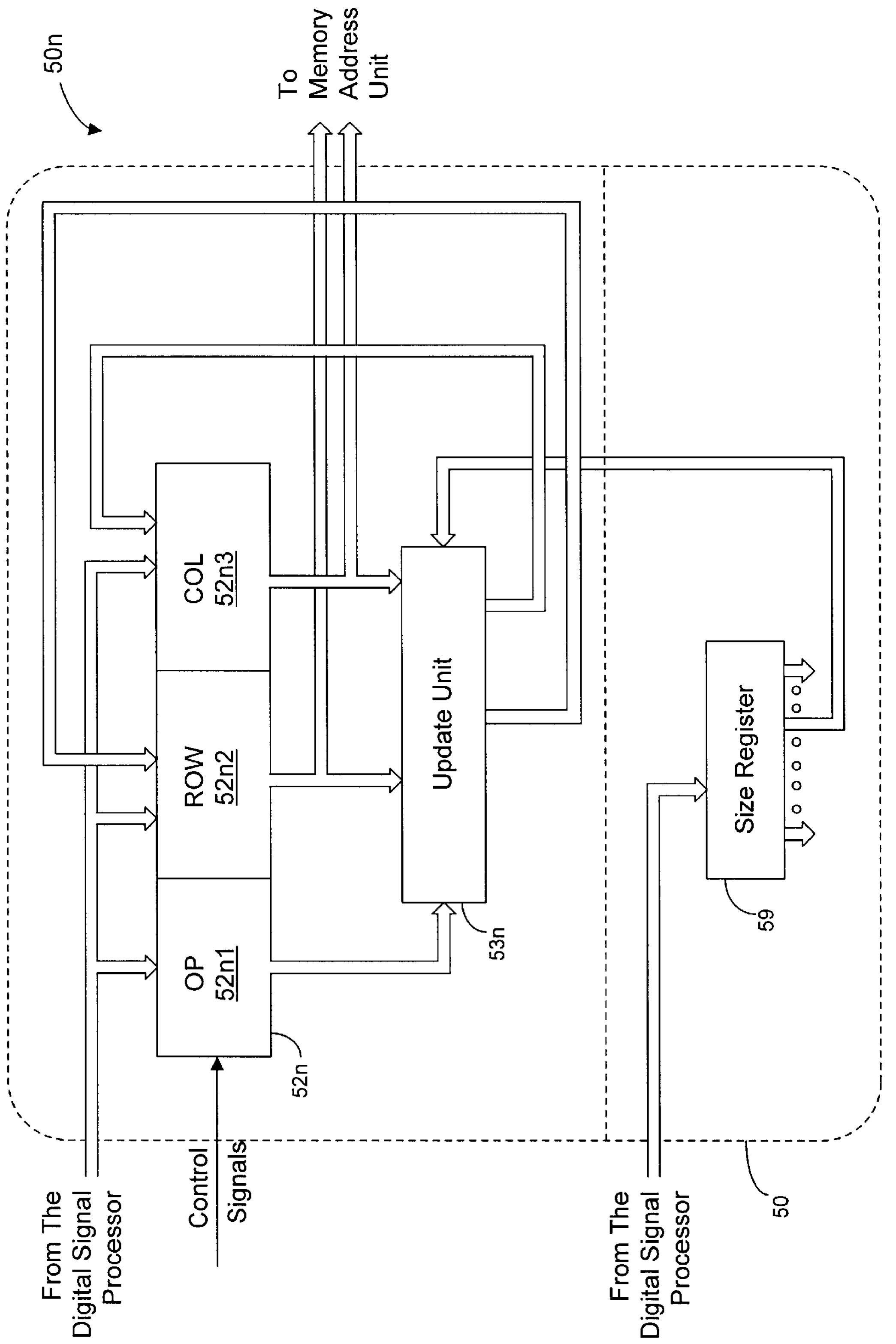
FIG. 7 is a block diagram illustrating the configuration of a pointer unit in the search accelerator unit according to the present invention.

Referring to FIG. 7, a block diagram of a pointer unit 50*n* is shown. The pointer unit includes a pointer register 52*n* and an update unit 53*n*. The pointer register 52*n* has an operation code stored in the OP register portion 52*n*1. The pointer register 52*n* further includes a row portion 52*n*2 for storing an array row index and a column portion 52*n*3 for storing an array row index. The initial array indices are received from the digital signal processor unit. The update unit 53*n* is initialized to respond to the OP code portion 52*n*1 of the pointer register in such a manner as to update the row and column indices stored in the pointer register so as to identify the next array location. The indices stored in the pointer register 52*n* are also applied to the memory address unit. In the memory address unit, the array indices are converted to an address in the memory unit. Also shown in FIG. 7 is a size register 59, the size register 59 being part of the SAU, but coupled to each pointer unit. The size register receives signals from the digital signal processor. A function of the size register is to permit the STEP parameter (increment) to be programmed. Another function of the size register is to permit the L parameter (width and height of the matrix) to be programmed.

To compute the address required to access the proper memory location, the memory address unit 510 of the search accelerator unit computes the values r=max(Row, Col) and c=min(Row, Col). The address, addr, in the memory unit 60 is then computed as $$addr=r+c\cdot(c+1)/2 \qquad 2.)$$

After an access to the memory location, the Row and Col values are updated as determined by the four-bit OP code field. Because the high order bit is always zero, eight possible values exist for the OP code field. These eight values specify the eight possible ways to search (traverse) the full codebook matrix. The high order bit of the three bits specifies the direction, the middle bit specifies the increment, and the low order bit specifies whether the traverse of the full matrix is across a row or along a diagonal. The particular implementation of the OP code field along with the accompanying activity is shown in Table 2. All operations are computed modulo L. The triangular sub-array can be populated using OP codes 4 and 5 to address either along the main diagonal or along a row, each address being decremented by 1 to obtain the next address. The sub-array search uses OP codes 2 and 3 to address the triangular array along either a row or a diagonal, the search however incrementing by the STEP (=5 for the EFRC search). (For the present implementation of the search procedures, OP codes 1, 6, and 7 are not used and are included for future implementations.)

TABLE 2

| OP | Use | Post-change to Row | Post-change to Col |
|---|---|---|---|
| 0 | Along row increment by 1 | no change | col++ |
| 1 | Along diagonal Increment by 1 | row++ | col++ |
| 2 | Along row Increment by STEP | no change | col += STEP |
| 3 | Along diagonal Increment by STEP | row += STEP | col += STEP |
| 4 | Along row Decrement by 1 | no change | col−− |
| 5 | Along diagonal Decrement by 1 | row−− | col−− |
| 6 | Along row Decrement by STEP | no change | col −= STEP |
| 7 | Along diagonal Decrement by STEP | row −= STEP | col −= STEP |

As will be clear, other speech encoding techniques use matrices of different sizes. For example, the EVRC search procedure uses a matrix with 56 locations on a side as compared with 40 locations on a side for the EFRC search. In order to accommodate a plurality of (codebook) search procedures employing matrices of different sizes, an_additional register is added to the search accelerator unit. This register, the Size register, is shown in FIG. 7 and has three fields as illustrated below.

SIZE: ←6→←STEP(4)→←Modulus(6)→

The STEP field, as before, determines the size of the increment for OP codes 2 and 3 of Table 2. The Modulus field specifies the effective size of the matrix used in the search. (Note that the 6-bit Modulus field is the same as the L parameter of Table 1.) indicated above, the Modulus field would be 40 for the EFRC search procedure or 56 for the EVRC search procedure. The six most significant bits of the Size register are reserved for future use.

The foregoing description includes several features for which several options are available. For example, with respect to the memory system 60, the storage locations of this memory system can be located as part of the search accelerator unit 50, as part of either the X memory system 23 or the Y memory system 22 or both, or could be located in a free-standing memory unit.

With respect to the data registers VAL (e.g., 5012) as shown in FIG. 6, each viewport includes a (VAL) data register. The VAL register can also be used as a prefetch register. This prefetch functionality is required because of the added time to convert the sub-array address (row, col) to a memory address. Otherwise, the address conversion can delay the availability of data on consecutive read instructions. However, the delay in updating the address in the pointer register then becomes critical.

For certain applications, the processor needs to determine the current row for one of the diagonal viewports programmed for diagonal access. Typically, the processor requires the row index for the most recent access. When the pointer unit is accessed, the search accelerator unit will return the row index of the most recently accessed row rather than the next row to be accessed.

During an individual search sequence, the OP code for a given viewport does not change. In one embodiment of the invention, the digital signal processor must place an OP code in each data group written into the pointer register. This process can introduce several additional instructions for the digital signal processor. According to another embodiment, an unused high-order bit of the pointer field can be used to determine whether, on a write operation, to use the preexisting OP code, i.e., the OP code already in the pointer unit and in particular a 0 in that high order bit causes the OP code to be unchanged.

As indicated above, the number of viewports can depend on the application. In the EFRC interaction with the matrix, illustrated as an example above, 10 viewports have been used. For other implementations of matrix processing, a different number of viewports can provide better processing capability.

In the foregoing discussion, the VAL registers resided in a memory-mapped array with a VAL register associated with each viewport. According to another embodiment of the present invention, two arrays of ten registers VAL0[0¯9] and VAL1[0¯9] are included in the search accelerator unit. When the processor reads the VAL0[k] register, the same value is read as for the VAL1[k] register. The difference between the two set of registers is that for k viewport the VAL0[k] register results in the associated pointer being auto-incremented, while reading the VAL1[k] register results in the associated pointer being auto-decremented. Referring to Table 3, the OP code table for this embodiment is shown. The additional ten registers will be most useful for OP codes 4 and 5. For these two OP codes, a new symbol, ptr, has been added. The ptr symbol is provided by concatenating fields {row, col}. The value, ptr, is used to directly address the SAU as a linear array.

TABLE 3

| VAL | OP | Use | Post-change to Row | Post-change to Col |
|---|---|---|---|---|
| 0 | 0 | Along row. Increment by 1 | no change | col++ |
| 0 | 1 | Along diagonal, Increment by 1 | row++ | col++ |
| 0 | 2 | Along row, Increment by STEP | no change | col += STEP |
| 0 | 3 | Along diagonal, Increment by STEP | row += STEP | col += STEP |
| 0 | 4 | Increment ptr by 1 | ptr++ | |
| 0 | 5 | Increment ptr by STEP | ptr += STEP | |
| 0 | 6 | Reserved | Reserved | Reserved |
| 0 | 7 | Reserved | Reserved | Reserved |
| 1 | 0 | Along row. Decrement by 1 | no change | col−− |
| 1 | 1 | Along diagonal, Decrement by 1 | row−− | col−− |
| 1 | 2 | Along row, Decrement by STEP | no change | col −= STEP |
| 1 | 3 | Along diagonal, Decrement by STEP | row −= STEP | col −= STEP |
| 1 | 4 | Decrement ptr by 1 | ptr−− | |
| 1 | 5 | Decrement ptr by STEP | ptr −= STEP | |
| 1 | 6 | Reserved | Reserved | Reserved |
| 1 | 7 | Reserved | Reserved | Reserved |

While the present invention has been described in terms of codebook processing of speech, the techniques can be applied to any matrix processing environment which requires access to a sequence of locations having indices in which at least one index is altered with the same increment. With OP codes 4 and 5, this functionality is expanded to linear arrays as well.

The Appendices 1, 2, 3, and 4 are pseudocode programs illustrating aspects of the present invention. Appendix 1 shows how an EFRC encoder populates the matrix of correlation on the main diagonal. Appendix 2 illustrates how an EFRC encoder populates the matrix of correlation values off of the main diagonal. Appendix 3 shows how an EFRC encoder accesses the matrix of correlation values when a codebook search is performed. And, Appendix 4 illustrates how the EFRC encoder uses the search accelerator unit to access the matrix of correlation values when it performs a codebook search.

The search accelerator unit can be adapted to data arrays that have differing characteristics from what has been described. For example, a (full rectangular) matrix, R(i,j), having the property that R(i,j)=f(|i−j|) where f is any function and |x| designates the absolute value of x can be formed by computing circular correlations. (Note that the symmetry of this matrix is stronger than the symmetry provided by reflection across the major diagonal of the matrix.) When a 40×40 matrix is used, then |i−j| can assume the values between 0 and 40. That is, the 40×40 matrix with this functional symmetry needs only 40 (16-bit) words to store the entire matrix (as compared to 820 words for the 40×40 matrix with symmetry only across the major diagonal). With respect to implementation, the operation of the search accelerator unit is generally the same as described above. As will be clear, populating the matrix can be performed with 40 write operations rather than the 820 write operations of the EFRC procedure. In addition, a viewport will, after modifying the row and column as shown in Table 2, compute the memory address by forming the absolute value of (row-column), i.e., 1 row-column 1.

While the search accelerator unit has been described in terms as accessing a matrix, it will be clear that a search accelerator unit can be used for linear addressing, i.e., of a conventional memory unit. Using a search accelerator unit in this manner could provide a large number of pointer units for complicated search of a linear array.

Those skilled in the art will readily implement the steps necessary to provide the structures and the methods disclosed herein, and will understand that the process parameters, materials, dimensions, and sequence of steps are given by way of example only and can be varied to achieve the desired structure as well as modifications that are within the scope of the invention. Variations and modifications of the embodiments disclosed herein may be made based on the description set forth herein, without departing from the spirit and scope of the invention as set forth in the following claims.

Appendix 1

```
for (k=39; k>=0; k--)
rr[k,k] = ....
```

Appendix 2

```
for (dec=1; dec<40; dec++)
for (j=39; k=j-dec; k>=0; j--, k--)
rr[j,k] = rr[k,j]=...
```

Appendix 3

```
for (i0 = pos0; i0 , 40; i0 += 5)
{
if(test(i0))
{
... = f0((rr[i0,i0], ...);
for (i1 = ix =pos1; ix, 40; ix += 5)
{
... = f1(rr[ix, ix], ...);
... = f2(rr[i0, ix], ...);
if(ix better than i1) i1 = ix;
}
```

-continued

```
for (i2 = ix = pos2; ix , 40; ix += 5)
{
... = f3(rr[ix, ix], ...);
... = f4(rr[i1, ix], ...);
... = f5(rr[i0, ix], ...);
if(ix is better than i2) i2= ix;
}
for (i3 = ix = pos3; ix <40; ix +=5)
{
... = f6(rr[ix, ix], ...);
... = f7(rr[i2, ix], ...);
... = f8(rr[i1, ix], ...);
... = f9(rr[i0, ix], ...);
if(ix is better than i3) i3 = ix
}
}
}
Appendix 4

dn1 = -2;
dn2 = -3;
dp0 = &VAL[7];
dp1 = &VAL[4];
dp2 = &VAL[0];
PTR[9]= <3, pos0, pos0>; //work along main diagonal
PTR[7]= <3, pos1, pos1>; //work along main diagonal
PTR[4]= <3, pos2, pos2>; //work along main diagonal
PTR[0]= <3, pos3, pos3>; //work along main diagonal
PTR[8]= <2, 0, pos1>; //work across row TBD
PTR[5]= <2. 0, pos2>; //work across row TBD
PTR[6]= <2, 0, pos2>; //work across row TBD
PTR[1]= <2, 0, pos3>; //work across row TBD
PTR[2]= <2, 0, pos3>; //work across row TBD
PTR[3]= <2, 0, pos3>; //work across row TBD
loop8 {
r0h = *VAL[9] //note that this alters ROW[9]
if (test(ROW[9]))
{
... = f0(r0h, ...);
ROW[8]= ROW[9];//PTR[8]= <2, ROW[9], pos1>
loop8 {
... = f1(*dp0++, ...); //this alters ROW[7]
... = f2(*dp0--, ...);
if(ix better than i1)i1 = ix
}
ROW[5]= ROW[9]; //PTR[5]= <2, ROW[9], pos2>
ROW[6]= ROW[7]; //PTR[6]= <2, ROW[7], pos2>
loop 8 {
... = f3(*dp1++, ...); //this alters row 4
... = f4(*dp1++, ...);
... = f5(*dp1##, ...); //dp1 -= 2
if(ix is better than i2) i2 = ix
}
ROW[1]= ROW[9] // PTR[1]= <2, ROW[9], pos3>
ROW[2]= ROW[7] // PTR[2]= <2, ROW[7], pos3>
ROW[3]= ROW[4] // PTR[3]= <2, ROW[4], pos3>
loop 8 {
... =f6(*dp2++, ...);
... =f7(*dp2++, ...);
... =f8(*dp2++, ...);
... =f9(*dp2##, ...); //dp2##-=3
if(ix is better than i3) i3 = ix;
}
}
}
```

What is claimed is:

1. A search accelerator unit, the search accelerator unit determining the exchange of data signal groups between a memory unit and a processor, the search accelerator unit comprising:

at least one viewport, each viewport including:

at least one data register, the data registers exchanging data with the memory unit and the processor; and a pointer unit, the pointer unit providing a sequence of array indices, wherein each indices of the sequence differs from a next previous indices by a predetermined value in at least one index of the indices; and a memory address unit, the memory address unit receiving array indices from the pointer unit; the memory address unit providing an address for a storage location in the memory unit derived from the any indices;

wherein the plurality of storage locations store data entries used in encoding speech wherein the storage locations store data entries that are positioned on the major diagonal of the array and the data entries on one side of the major diagonal of the array.

2. The search accelerator unit as recited in claim 1 wherein the processor is a digital signal processor.

3. The search accelerator unit as recited in claim 1 further including a size register, the size register including first field determining the size of matrix to be accessed, the size register determining the predetermined value.

4. The search accelerator unit as recited in claim 1 wherein the memory unit is a linear array.

5. A search accelerator unit, the search accelerator unit determining the exchange of data signal groups between a memory unit and a processor, the search accelerator unit comprising:

at least one viewport, each viewport including:

at least one data register, the data registers exchanging data with the memory unit and the processor; and a pointer unit, the pointer unit providing a sequence of array indices, wherein each indices of the sequence differs from a next previous indices by a predetermined value in at least one index of the indices; and a memory address unit, the memory address unit receiving array indices from the pointer unit; the memory address unit providing an address for a storage location in the memory unit derived from the array indices;

wherein the viewport provides to a processor a pointer unit address and a data register address.

6. The search accelerator unit as recited in claim 5 wherein the pointer unit includes:

a current register having an operation code field and an array indices field, the array indices field identifying a current array location, and update apparatus for altering the array indices field in a pre-established manner, the pre-established manner determined by the operation code.

7. The search accelerator unit as recited in claim 6, wherein the operation code can be entered in the current register by the processor.

8. The search accelerator unit as recited in claim 6 wherein the pointer unit includes a row register, the row register accessible to the processor for providing a row index of a most recently accessed location.

9. The search accelerator unit as recited in claim 7 wherein new array indices can be entered in the current register by a processor.

10. The search accelerator unit of claim 9 wherein, when a preselected position in a data field to be stored in the current register has a first value, the operation code in the current register will not be changed; and wherein when the preselected position in the data field to be stored in the current register has a second value, a new operation code will be stored in the current register.

11. The data processing system of claim 10 wherein the second value is a logic 1.

12. A data processing system for processing speech signals, the system comprising:

a memory unit for storing the data entries of the array;

a processor; and a search accelerator unit exchanging signal groups with the processor, the search accelerator unit exchanging signal groups with the memory unit; the search accelerator unit in response to a set of array indices that identify and array location accessing a group of locations in the memory unit, the group of array locations having at least one index of the indices incremented by a predetermined amount to provide the indices for the next sequential array location for the group of locations; the search accelerator unit including a memory address unit, the memory address unit providing a memory unit location address in response to a set of indices; and at least one viewport, the viewport storing a cunt set of indices identifying a current array location, the viewport incrementing at least one index of the current indices the predetermined amount, the viewport applying the current set of indices to the memory unit; and, at least one data register;

wherein each viewport includes:

a pointer register, the pointer register storing the current array location indices; and an update unit, the update unit incrementing at least one index of the current indices the predetermined amount, the update unit storing the new indices in the pointer register;

wherein the pointer register includes an operation code field, the operation code field controlling the operation of the update unit; and, wherein when a preselected position in a data field to be stored in the pointer register has first value, the operation code in the pointer register is not changed; when the preselected position in a data field to be stored in the pointer register has a second value, the operation code in the pointer register is changed.

13. The data processing system as recited in claim 12 wherein the search accelerator unit includes a plurality of viewports, each viewport including at least one data register.

14. The data processing system as recited in claim 13 wherein the processor is a digital signal processor.

15. The data processing system as recited in claim 14 wherein the array of data entries are the entries for a codebook.

16. The data processing unit as recited in claim 15 wherein the array of data entries is reduced ACELP codebook represented by a triangular array, the triangular array being a sub-array of an array having redundant locations.

17. The data processing item as recited in claim 12 wherein the contents of the pointer register are initially entered by the processor.

18. The data processing system as recited in claim 17 wherein a viewport has an address signal group associated therewith.

19. The data processing system as recited in claim 12 wherein the search accelerator unit includes a size register, the size register being programmed by the processor, the size register including a field determining the predetermined amount, the size register including a field identify the matrix size.

20. The data processing unit as recited in claim 12 wherein the memory unit is a linear array.

21. The data processor unit as recited in claim 12 wherein the pointer unit includes a row register accessible to the processor, wherein the row register stores a row index of a most recently accessed location.

22. The data processing system of claim 12 wherein the second value is a logic 1.

23. A method of performing a sequence of accesses to locations of a storage array by a processor, the method comprising:

applying an updated array location address by the processor to a pointer unit external to the processor;

accessing the array location at the array location address;

incrementing the array location address to provide a new updated array location address;

accessing the array at the updated array location;

storing in a register a first field determining the size of the array;

storing in the register a second field determining the amount by which the array address is incremented;

leaving an operation code unchanged when a data field to be stored in the pointer unit has a first value in a preselected location; and changing the operation code in the pointer unit when a data field to be stored in the pointer unit has a second value in the preselected location.

24. The method as recited in claim 23 wherein the incrementing is performed a predetermined number of times.

25. The method as recited in claim 23 wherein the incrementing is performed in response to a control signal from the processor.

26. The method as recited in claim 23 wherein the array is stored in a to memory unit, each accessing includes:

converting the updated array location address to a memory unit address; and accessing the memory location at the memory unit address, the memory location storing contents of a corresponding array location address.

27. The method as recited in claim 26 wherein the incrementing step includes incrementing at least one index of updated array location address by a predetermined amount.

28. The method as recited in claim 27 wherein each sequence of accessing steps can have a different predetermined amounts associated therewith.

29. The method as recited in claim 28 wherein the accesses of the array implement at least a part of a search procedure of an ACELP array, wherein accessing the ACELP array can include accessing a sequence of array row locations or accessing a sequence of array diagonal locations.

30. The method as recited in claim 29 wherein the ACELP array is triangular sub-array of a full ACELP array.

31. The method as recited in claim 30 wherein accessing a sequence of array row locations for the full ACELP array is implemented by a combination of row and column accesses in the triangular sub-array.

32. The method as recited in claim 31 wherein accessing of sequences of sub-array locations implements an EFRC search procedure.

33. The method as recited in claim 23 wherein the array is triangular sub-array of a matrix array, the contents of the matrix array location being symmetric about a matrix diagonal.

34. The method as recited in claim 23 wherein the matrix array is ACELP array, the pointer registers facilitating a search of the ACELP array.

35. The method as recited in claim 34 wherein the search procedure of the ACELP array is an EFRC search procedure.

36. The method as recited in claim 35 wherein accessing a sequence of array row locations for the full ACELP array is implemented by a combination of row and column accesses in the triangular sub-array.

37. The method as recited in claim 36 further comprising storing a row index of a most recently accessed location, wherein the stored row index is accessible to the processor.

38. The method as recited in claim 23 wherein the storage array is a linear array.

39. The method as recited in claim 23 comprising;

leaving an operation code unchanged when a data field to be stored in the pointer unit has a first value in a preselected location; and changing the operation code in the pointer unit when a data field to be stored in the pointer unit has a second value in the preselected location.

40. The method as recited in claim 23 wherein the second value is a logic 1.

41. A search accelerator unit, the search accelerator unit determining the exchange of data signal groups between a memory unit and a processor, the search accelerator unit comprising:

at least one viewport, each viewport including:

at least one data register, the data registers exchanging data with the memory unit and the processor; and a pointer unit, the pointer unit providing a sequence of array indices, wherein each indices of the sequence differs from a next previous indices by a predetermined value in at least one index of the indices;

a memory address unit, the memory address unit receiving array indices from the pointer unit; the memory address unit providing an address for a storage location in the memory unit derived from the array indices;

wherein the plurality of storage locations store data entries used in encoding speech; and wherein the storage locations store data entries that are positioned on the major diagonal of the array and the data entries on one side of the major diagonal of the array.

* * * * *